United States Patent
Jiang (10) Patent No.: US 11,570,693 B2
(45) Date of Patent: Jan. 31, 2023

(54) METHOD AND APPARATUS FOR SENDING AND RECEIVING SYSTEM INFORMATION, AND USER EQUIPMENT AND BASE STATION

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/611,217

(22) PCT Filed: May 11, 2017

(86) PCT No.: PCT/CN2017/083951
§ 371 (c)(1),
(2) Date: Nov. 6, 2019

(87) PCT Pub. No.: WO2018/205227
PCT Pub. Date: Nov. 15, 2018

(65) Prior Publication Data
US 2020/0145905 A1 May 7, 2020

(51) Int. Cl.
*H04W 48/10* (2009.01)
*H04W 48/14* (2009.01)

(52) U.S. Cl.
CPC ........... *H04W 48/10* (2013.01); *H04W 48/14* (2013.01)

(58) Field of Classification Search
CPC combination set(s) only.
See application file for complete search history.

(56) References Cited

U.S. PATENT DOCUMENTS

| | | | |
|---|---|---|---|
| 2010/0214995 A1* | 8/2010 | Iyer | H04W 48/12 370/329 |
| 2013/0294321 A1* | 11/2013 | Wang | H04W 28/16 370/312 |
| 2015/0036494 A1* | 2/2015 | Kotecha | H04L 12/189 370/235 |

(Continued)

FOREIGN PATENT DOCUMENTS

| | | |
|---|---|---|
| CN | 102300157 A | 12/2011 |
| CN | 102318409 A | 1/2012 |

(Continued)

OTHER PUBLICATIONS

Mediatek Inc., "NR SI Unicast", 3GPP TSG-RAN2#97 Meeting R2-1701362, Athens, Greece, Feb. 13-17, 2017.

(Continued)

*Primary Examiner* — Muthuswamy G Manoharan
(74) *Attorney, Agent, or Firm* — Syncoda LLC; Feng Ma (57) ABSTRACT

A method for sending system information includes: receiving a system information (SI) request sent by at least one user equipment (UE); determining, according to the received SI request, at least one, in the SI requested by each UE, of a first SI set sent in a unicast manner and a second SI set sent in a broadcast manner; and returning, to each UE, a response message of the SI request, wherein the response message carries at least one of the first SI set of the corresponding UE and indication information for instructing the corresponding UE to receive the second SI set.

12 Claims, 5 Drawing Sheets

(56) References Cited

U.S. PATENT DOCUMENTS

| | | | |
|---|---|---|---|
| 2016/0234736 A1 | 8/2016 | Kubota et al. | |
| 2016/0234759 A1 | 8/2016 | Kubota et al. | |
| 2018/0288683 A1* | 10/2018 | Bendlin | H04W 48/14 |
| 2019/0053046 A1* | 2/2019 | Zhou | H04W 8/26 |
| 2020/0068477 A1* | 2/2020 | Awada | H04W 48/08 |

FOREIGN PATENT DOCUMENTS

| | | | | |
|---|---|---|---|---|
| CN | 106604230 A | | 4/2017 | |
| WO | WO 2018/165955 | * | 9/2018 | H04W 48/08 |

OTHER PUBLICATIONS

LG Electronics Inc., "SI request procedure using MSG3" 3GPP TSG-RAN WG2 Meeting #97bis R2-1703602, Spokane, USA, Apr. 3-7, 2017.

Huawei, Hisilicon "Design on MSG1 based request and failure handling" 3GPP TSG-RAN WG2 Meeting #98 R2-1705175 Hangzhou, China, May 15-19, 2017.

CATT "Procedures of on demand SI delivery and error handling" 3GPP TSG-RAN WG2 Meeting #98 R2-1704236 Hangzhou, China, May 15-19, 2017.

3GPP TSG-RAN WG2 #95bis R2-167050, Kaohsiung, Taiwan, Other SI delivery in broadcast manner, Oct. 10-14, 2016, Agenda item: 9.2 2.2, LG Electronics Inc.

3GPP TSG-RAN WG2 Meeting #96 R2-168750, Reno, Nevada, US, Further considerations on other SI, Nov. 14-18, 2016, Agenda item: 9.2.2.2, CMCC.

CN Office Action in application No. 201780000365.6, dated Jun. 1, 2020.

Extended European Search Report in U.S. Appl. No. 17/909,267, dated Oct. 22, 2020.

Report of email discussion on [94#40] [NR] System information, 3GPP TSG-RAN WG2 95; Gothenburg, Sweden, Aug. 22-26, 2016; R2-165201, Samsung.

Report of email discussion on [95#29] [NR] On demand Si, 3GPP TSG-RAN WG295bis; Kaohsiung, Taiwan, Oct. 10-14, 2016; R2-166497, Samsung.

\* cited by examiner

METHOD AND APPARATUS FOR SENDING AND RECEIVING SYSTEM INFORMATION, AND USER EQUIPMENT AND BASE STATION

CROSS-REFERENCE TO RELATED APPLICATION

This application is a national stage of International Application No. PCT/CN2017/083951 filed on May 11, 2017, the disclosure of which is hereby incorporated by reference in its entirety.

TECHNICAL FIELD

The present disclosure relates to communication technologies, and more particularly, to a method and a device for transmitting and receiving system information, user equipment and a base station.

BACKGROUND

With the rapid development of radio communication technologies, large amounts of System Information (SI) of Long-Term Evolution (LTE) will be involved, thus transmitting the system information in a periodic broadcast mode will lead to larger power consumption of a base station and a low utilization rate of spectrum resources. When there is few user Equipment (UE) being accessed, periodically broadcasting the system information will cause waste of resources. In order to alleviate the waste of resources and larger power consumption of the base station caused by the broadcasting of the system information, operators come to consider solving the above problems by classifying and transmitting the system information.

In related technologies, during the research and discussion of the project of the 5th Generation (5G) Mobile Communication Technology, the system information can be divided into a first type of system information which may include system information related to cell selection and accessing and a second type of system information which may include system information other than the first type of system information. In relevant technology, the first type of system information can still be sent in a broadcast manner. However, the second type of system information may be sent in a broadcast mode or in a unicast mode after a request for the second type of system information sent from the UE is received. For example, after a request for the system information which is carried in a preamble sequence transmitted from the UE is received, the requested system information is transmitted in a broadcast mode by default; after a request for the system information which is carried in a connection establishment request transmitted from the UE is received, the requested system information is transmitted in a broadcast mode or in a unicast mode by default; after a request for the system information which is carried in dedicated signaling transmitted from the UE is received, the requested system information is transmitted in a unicast mode by default. However, it is not flexible enough to restrict to transmit the system information in a broadcast mode or in a unicast mode.

SUMMARY

In view of this, the present application discloses a method and a device for transmitting and receiving system information, user equipment and a base station, to determine at least one of a first set of SI transmitted in a unicast mode and a second set of SI transmitted in a broadcast mode in SI for which each UE requests according to a received SI request, so as to unicast the first set of SI and broadcast the second set of SI to a corresponding UE, and the transmitting manner is flexible.

According to a first aspect of embodiments of the present disclosure, there is provided a method for transmitting system information, including:

receiving a system information SI request transmitted from at least one user equipment UE;

determining at least one of a first set of SI transmitted in a unicast mode and a second set of SI transmitted in a broadcast mode in SI for which each UE requests according to the SI request; and returning a response message of the SI request to each UE, the response message carrying at least one of the first set of SI of the corresponding UE and indication information for instructing the corresponding UE to receive the second set of SI.

In an embodiment, the determining the at least one of the first set of SI transmitted in the unicast mode and the second set of SI transmitted in the broadcast mode in the SI for which each UE requests according to the SI request includes:

determining the number of UEs requesting for each SI according to the SI request;

for each SI, if the number of UEs requesting for a current SI is less than a preset number, determining that the current SI is transmitted in a unicast mode, and if the number of UEs requesting for the current SI is equal to or greater than the preset number, determining that the current SI is transmitted in a broadcast mode; and determining at least one of a first set of SI transmitted in a unicast mode and a second set of SI transmitted in a broadcast mode in SI for which each UE requests according to the determined SI transmitted in the unicast mode and the determined SI transmitted in the broadcast mode.

In an embodiment, if an SI identifier transmitted by a current base station in a broadcast mode and not successfully decoded by a corresponding UE is carried in the SI request, the determining at least one of the first set of SI transmitted in the unicast mode and the second set of SI transmitted in the broadcast mode in SI for which each UE requests according to the SI request includes:

adding SI corresponding to the SI identifier not successfully decoded by the corresponding UE to the first set of SI of the corresponding UE.

In an embodiment, the indication information includes at least one of the following information:

SI in the second set of SI being transmitted in a broadcast mode;

the number of monitor windows of the SI in the second set of SI uniformly or separately indicated; and a broadcast window location at which each SI in the second set of SI starts to be monitored.

According to a second aspect of embodiments of the present disclosure, there is provided a method for receiving system information, including:

transmitting a system information (SI) request to a base station;

receiving a response message of the SI request returned by the base station according to the SI request, and parsing at least one of a first set of SI and indication information for instructing a current UE to receive a second set of SI from the response message, wherein the first set of SI includes SI transmitted by the base station in a unicast mode in SI for which the current UE requests, and the second set of SI includes SI transmitted by the base station in a broadcast mode in SI for which the current UE requests; and receiving the second set of SI according to the indication information if the indication information is parsed.

In an embodiment, the indication information includes at least one of the following information:

SI in the second set of SI being transmitted in a broadcast mode;

the number of monitor windows of the SI in the second set of SI uniformly or separately indicated; and a broadcast window location at which each SI in the second set of SI starts to be monitored.

In an embodiment, the receiving the second set of SI according to the indication information includes:

obtaining a broadcast window at which monitoring is initiated, the broadcast window being determined according to the broadcast window location in the indication information, or a broadcast period obtained in advance; and continuously monitoring a preset number of broadcast windows from the obtained broadcast window to receive the SI transmitted by the base station in the broadcast mode, the preset number being equal to the number of monitor windows, or being appointed by the current UE and the base station.

In an embodiment, an SI identifier transmitted by the base station in a broadcast mode and not successfully decoded by a current UE is carried in the SI request.

According to a third aspect of embodiments of the present disclosure, there is provided a device for transmitting system information, including:

a receiving module configured to receive a system information SI request transmitted from at least one user equipment UE;

a determining module configured to determine at least one of a first set of SI transmitted in a unicast mode and a second set of SI transmitted in a broadcast mode in SI for which each UE requests according to the SI request received by the receiving module; and a returning module configured to return a response message of the SI request to each UE, the response message carrying at least one of the first set of SI of the corresponding UE and indication information for instructing the corresponding UE to receive the second set of SI determined by the determining module.

In an embodiment, the determining module includes:

a first determining sub-module configured to determine the number of UEs requesting for each SI according to the SI request;

a second determining sub-module configured to, for each SI, if the number of UEs requesting for a current SI determined by the first determining sub-module is less than a preset number, determine that the current SI is transmitted in a unicast mode, and if the number of UEs requesting for the current SI determined by the first determining sub-module is equal to or greater than the preset number, determine that the current SI is transmitted in a broadcast mode; and a third determining sub-module configured to determine at least one of a first set of SI transmitted in a unicast mode and a second set of SI transmitted in a broadcast mode in SI for which each UE requests, according to the SI transmitted in the unicast mode and the SI transmitted in the broadcast mode determined by the second determining sub-module.

In an embodiment, if an SI identifier transmitted by a current base station in a broadcast mode and not successfully decoded by a corresponding UE is carried in the SI request, the determining module is configured to:

add SI corresponding to the SI identifier not successfully decoded by the corresponding UE to the first set of SI of the corresponding UE.

In an embodiment, the indication information includes at least one of the following information:

SI in the second set of SI being transmitted in a broadcast mode;

the number of monitor windows of the SI in the second set of SI uniformly or separately indicated; and a broadcast window location at which each SI in the second set of SI starts to be monitored.

According to a fourth aspect of embodiments of the present disclosure, there is provided a device for receiving system information, including:

a transmitting module configured to transmit a system information (SI) request to a base station;

a receiving and parsing module configured to receive a response message of the SI request returned by the base station according to the SI request transmitted by the transmitting module, and parse at least one of a first set of SI and indication information for instructing a current UE to receive a second set of SI from the response message, wherein the first set of SI includes SI transmitted by the base station in a unicast mode in SI for which the current UE requests, and the second set of SI includes SI transmitted by the base station in a broadcast mode in SI for which the current UE requests; and a receiving module configured to receive the second set of SI according to the indication information if the receiving and parsing module parses the indication information.

In an embodiment, the indication information includes at least one of the following information:

SI in the second set of SI being transmitted in a broadcast mode;

the number of monitor windows of the SI in the second set of SI uniformly or separately indicated; and a broadcast window location at which each SI in the second set of SI starts to be monitored.

In an embodiment, the receiving module includes:

an obtaining sub-module configured to obtain a broadcast window at which monitoring is initiated, the broadcast window being determined according to the broadcast window location in the indication information, or a broadcast period obtained in advance; and a monitoring sub-module configured to continuously monitor a preset number of broadcast windows from the broadcast window obtained by the obtaining sub-module to receive the SI transmitted by the base station in the broadcast mode, the preset number being equal to the number of monitor windows, or being appointed by the current UE and the base station.

In an embodiment, an SI identifier transmitted by the base station in a broadcast mode and not successfully decoded by a current UE is carried in the SI request.

According to a fifth aspect of embodiments of the present disclosure, there is provided a base station, including:

a processor;

a memory for storing instructions executable by the processor;

wherein the processor is configured to:

receive a system information SI request transmitted from at least one user equipment UE;

determine at least one of a first set of SI transmitted in a unicast mode and a second set of SI transmitted in a broadcast mode in SI for which each UE requests according to the SI request; and return a response message of the SI request to each UE, the response message carrying at least one of the first set of SI of the corresponding UE and indication information for instructing the corresponding UE to receive the second set of SI.

According to a sixth aspect of embodiments of the present disclosure, there is provided a user equipment, including:

a processor;

a memory for storing instructions executable by the processor;

wherein the processor is configured to:

transmit a system information (SI) request to a base station;

receive a response message of the SI request returned by the base station according to the SI request, and parse at least one of a first set of SI and indication information for instructing a current UE to receive a second set of SI from the response message, wherein the first set of SI includes SI transmitted by the base station in a unicast mode in SI for which the current UE requests, and the second set of SI includes SI transmitted by the base station in a broadcast mode in SI for which the current UE requests; and receive the second set of SI according to the indication information if the indication information is parsed.

According to a seventh aspect of embodiments of the present disclosure, there is provided a computer-readable storage medium having stored therein computer programs that, when executed by a processor, carry out the steps of the above-described method for transmitting the system information.

According to an eighth aspect of embodiments of the present disclosure, there is provided a computer-readable storage medium having stored therein computer programs that, when executed by a processor, carry out the steps of the above-described method for receiving the system information.

The technical solutions provided by the embodiments of the present disclosure can include the following beneficial effects:

at least one of the first set of SI transmitted in the unicast mode and the second set of SI transmitted in the broadcast mode in the SI for which each UE requests is determined according to the received SI request from at least one UE, so as to unicast the first set of SI and broadcast the second set of SI to the corresponding UE, and the transmitting manner is flexible.

It is to be understood that both the foregoing general description and the following detailed description are exemplary and explanatory only and are not restrictive of the disclosure, as claimed.

DETAILED DESCRIPTION

A clear and through description will be given to the technical solution of the embodiments of the present disclosure with reference to the accompanying drawings of the present disclosure. Obviously, the illustrated embodiments are not all of the embodiments of the present disclosure, but only part of them. According to the embodiments of the present disclosure, all of the other embodiments obtained by those skilled in the art without consuming any creative work falls within the protection scope of the present disclosure.

Figure 1:
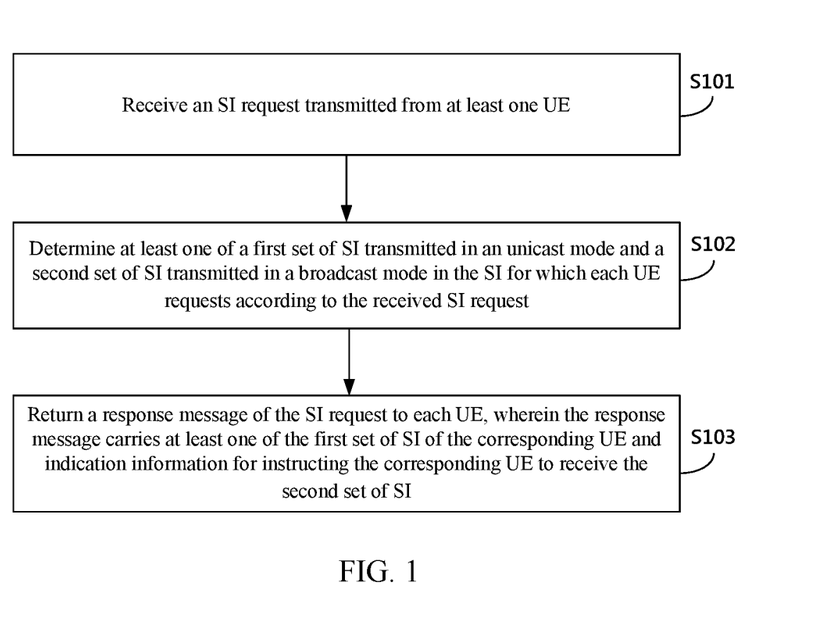
FIG. 1 is a flowchart illustrating a method for transmitting system information according to an exemplary embodiment of the present application.

FIG. 1 is a flowchart illustrating a method for transmitting system information according to an exemplary embodiment of the present application. This embodiment is described from the perspective of a base station side. As illustrated in FIG. 1, the method for transmitting the system information includes the following steps.

In step S101, an SI request transmitted from at least one UE is received.

The SI request may be carried in a preamble sequence, or a connection establishment request, or a dedicated radio resource control (RRC) message transmitted by the UE, to request for a piece of or some pieces of SI.

In step S102, at least one of a first set of SI transmitted in a unicast mode and a second set of SI transmitted in a broadcast mode in the SI for which each UE requests is determined according to the received SI request.

Figure 2:
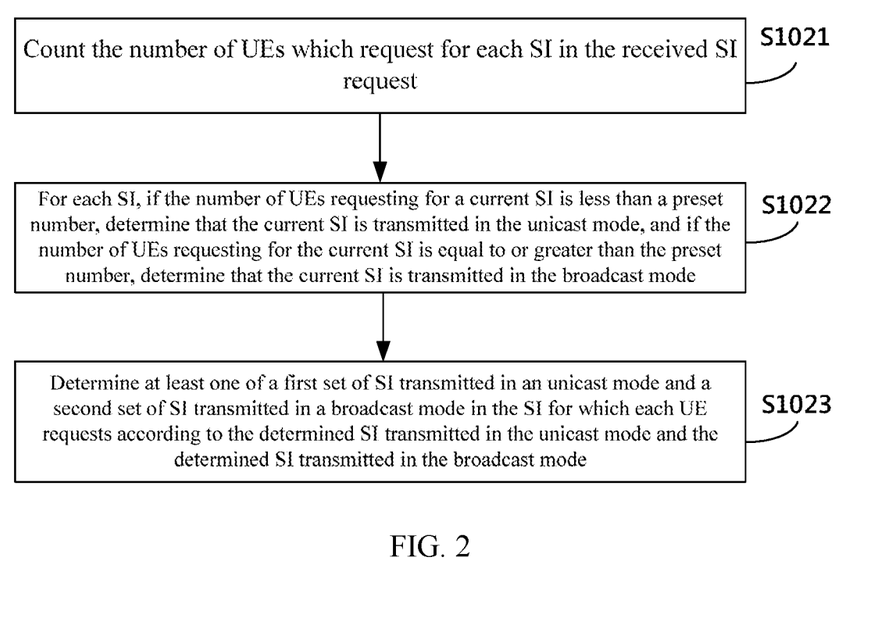
FIG. 2 is a flowchart illustrating a method for determining at least one of a first set of SI and a second set of SI according to an exemplary embodiment of the present application.

After receiving the SI request transmitted from the at least one UE, a base station may determine at least one of a first set of SI transmitted in a unicast mode and a second set of SI transmitted in a broadcast mode in the SI for which each UE requests in the following manners. As illustrated in FIG. 2, a method for determining at least one of the first set of SI and the second set of SI includes the following steps.

In step S1021, the number of UEs which request for each SI in the received SI request is counted.

For example, if an UE1 sends an SI request for requesting SI1, SI2 and SI3 to the base station, an UE2 sends an SI request for requesting SI1 and SI3 to the base station, and an UE3 sends an SI request for requesting SI1 and SI4 to the base station, the base station, according to the above-described SI requests, determines that the number of UEs which request for SI1 is 3, the number of UEs which request for SI2 is 1, the number of UEs which request for SI3 is 2, and the number of UEs which request for SI4 is 1.

In step S1022, for each SI, if the number of UEs requesting for a current SI is less than a preset number, it is determined that the current SI is transmitted in the unicast mode, and if the number of UEs requesting for the current SI is equal to or greater than the preset number, it is determined that the current SI is transmitted in the broadcast mode.

The preset number can be set as needed. Further description will be given with reference to the above example, assuming that the preset number is 2, as for SI1, the number of UEs requesting for the SI1 is greater than the preset number, it is determined that the SI1 is transmitted in the broadcast mode; as for SI2, the number of UEs requesting for the SI2 is less than the preset number, it is determined that the SI2 is transmitted in the unicast mode; as for SI3, the number of UEs requesting for the SI3 is equal to the preset number, it is determined that the SI3 is transmitted in the broadcast mode; and as for SI4, the number of UEs requesting for the SI4 is less than the preset number, it is determined that the SI4 is transmitted in the unicast mode.

In step S1023, at least one of a first set of SI transmitted in a unicast mode and a second set of SI transmitted in a broadcast mode in the SI for which each UE requests is determined according to the determined SI transmitted in the unicast mode and the determined SI transmitted in the broadcast mode.

Since it has been determined that SI1 and SI3 are transmitted in the broadcast mode, and SI2 and SI4 are transmitted in the unicast mode, it is determined that in the SI for which the UE1 requests, the first set of SI transmitted in the unicast mode includes SI2, and the second set of SI transmitted in the broadcast mode includes SI1 and SI3; in the SI for which the UE2 requests, the second set of SI transmitted in the broadcast mode includes SI1 and SI3; and in the SI for which the UE3 requests, the first set of SI transmitted in the unicast mode includes SI4, and the second set of SI transmitted in the broadcast mode includes SI1.

In addition, if an SI identifier transmitted by the current base station in a broadcast mode and not successfully decoded by the corresponding UE is carried in the SI request, the base station may add SI corresponding to the SI identifier not successfully decoded by the corresponding UE to the first set of SI of the corresponding UE.

It is assumed that an UE4 sends to the base station an SI request for requesting SI6, wherein SI6 is transmitted from the current base station in a broadcast mode and is not successfully decoded by the corresponding UE. Then, at this time, the SI6 may be included in a first set of SI of the UE4.

In step S103, a response message of the SI request is returned to each UE, wherein the response message carries at least one of the first set of SI of the corresponding UE and indication information for instructing the corresponding UE to receive the second set of SI.

After at least one of the first set of SI transmitted in the unicast mode and the second set of SI transmitted in the broadcast mode in the SI for which each UE requests is determined, a response message of the SI request may be returned to the corresponding UE. For the first set of SI transmitted in the unicast mode, the first set of SI may be carried in the response message to be returned to the corresponding UE; and for the second set of SI transmitted in the broadcast mode, indication information may be carried in the response message, for the UE to receive the second set of SI according to the indication information.

The indication information may include, but not limited to, at least one of the following information: the SI in the second set of SI being transmitted in a broadcast mode; the number of monitor windows of the SI in the second set of SI uniformly or separately indicated; and a broadcast window location at which each SI in the second set of SI starts to be monitored.

In the above-mentioned embodiments, at least one of the first set of SI transmitted in the unicast mode and the second set of SI transmitted in the broadcast mode in the SI for which each UE requests is determined according to the received SI request from at least one UE, so as to unicast the first set of SI and broadcast the second set of SI to the corresponding UE, and the transmitting manner is flexible.

Figure 3:
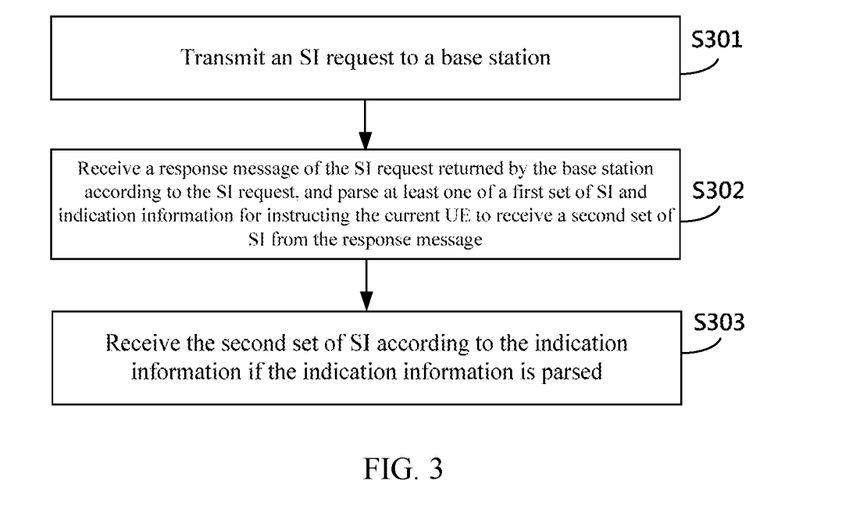
FIG. 3 is a flowchart illustrating a method for receiving system information according to an exemplary embodiment of the present application.

FIG. 3 is a flowchart illustrating a method for receiving system information according to an exemplary embodiment of the present application. This embodiment is described from the perspective of a UE side. As illustrated in FIG. 3, the method for receiving the system information includes the following steps.

In step S301, an SI request is transmitted to a base station.

An SI identifier transmitted by the base station in a broadcast mode and not successfully decoded by a current UE can be carried in the SI request.

In step S302, a response message of the SI request returned by the base station according to the SI request is received, and at least one of a first set of SI and indication information for instructing the current UE to receive a second set of SI is parsed from the response message.

The first set of SI includes SI transmitted by the base station in a unicast mode in SI for which the current UE requests, and the second set of SI includes SI transmitted by the base station in a broadcast mode in the SI for which the current UE requests.

In the embodiment, the indication information can include, but not limited to, at least one of the following information: the SI in the second set of SI being transmitted in a broadcast mode; the number of monitor windows of the SI in the second set of SI uniformly or separately indicated; and a broadcast window location at which each SI in the second set of SI starts to be monitored.

After receiving SI requests transmitted from UEs, the base station can determine the number of UEs requesting for each SI according to the SI requests from the multiple UEs; for each SI, if the number of UEs requesting for a current SI is less than a preset number, it is determined that the current SI is transmitted in a unicast mode, and if the number of UEs requesting for the current SI is equal to or greater than the preset number, it is determined that the current SI is transmitted in a broadcast mode; last of all, at least one of a first set of SI transmitted in a unicast mode and a second set of SI transmitted in a broadcast mode in SI for which each UE requests may be determined according to the determined SI transmitted in the unicast mode and the determined SI transmitted in the broadcast mode.

In addition, if an SI identifier transmitted by the base station in a broadcast mode and not successfully decoded by a current UE is carried in an SI request, the base station may add SI corresponding to the SI identifier not successfully decoded by the current UE to a first set of SI of the current UE.

In step S303, if the indication information is parsed, the second set of SI is received according to the indication information.

In the embodiment, a broadcast window at which monitoring is initiated can be obtained, and a preset number of broadcast windows beginning from the obtained broadcast window are continuously monitored, to receive the SI transmitted by the base station in the broadcast mode.

The broadcast window at which monitoring is initiated can be determined according to a broadcast window location in the indication information, or according to a broadcast period obtained in advance. The preset number can be equal to the number of monitor windows, or can be appointed by the current UE and the base station.

In the above embodiment, the SI request is transmitted to the base station, and the response message to the SI request returned by the base station according to the SI request is received, and at least one of the first set of SI and the indication information for instructing the current UE to receive the second set of SI is parsed from the response message. The first set of SI includes the SI transmitted by the base station in the unicast mode in the SI for which the current UE requests, and the second set of SI includes the SI transmitted by the base station in the broadcast mode in the SI for which the current UE requests. That is, the UE can receive the first set of SI transmitted by the base station in the unicast mode and the second set of SI transmitted by the base station in the broadcast mode, and the success rate of receiving is high.

Figure 4:
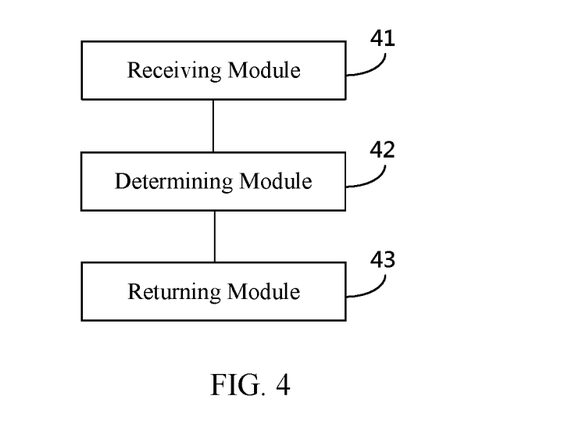
FIG. 4 is a block diagram illustrating a device for transmitting system information according to an exemplary embodiment.

FIG. 4 is a block diagram illustrating a device for transmitting system information according to an exemplary embodiment. The device can be located in a base station. As illustrated in FIG. 4, the device includes a receiving module 41, a determining module 42 and a returning module 43.

The receiving module 41 is configured to receive a system information (SI) request transmitted from at least one user equipment (UE).

The SI request may be carried in a preamble sequence, or a connection establishment request, or a dedicated radio resource control (RRC) message transmitted by the UE, to request for a piece of or some pieces of SI.

The determining module 42 is configured to determine at least one of a first set of SI transmitted in a unicast mode and a second set of SI transmitted in a broadcast mode in SI for which each UE requests according to the SI request received by the receiving module 41.

The returning module 43 is configured to return a response message of the SI request to each of the UEs, the response message carrying at least one of the first set of SI of the corresponding UE and indication information for instructing the corresponding UE to receive the second set of SI, which is determined by the determining module 42.

After at least one of the first set of SI transmitted in the unicast mode and the second set of SI transmitted in the broadcast mode in the SI for which each UE requests is determined, a response message of the SI request may be returned to the corresponding UE. For the first set of SI transmitted in the unicast mode, the first set of SI may be carried in the response message to be returned to the corresponding UE; and for the second set of SI transmitted in the broadcast mode, indication information may be carried in the response message for the UE to receive the second set of SI according to the indication information.

The indication information may include, but not limited to, at least one of the following information: the SI in the second set of SI being transmitted in a broadcast mode; the number of monitor windows of the SI in the second set of SI uniformly or separately indicated; and a broadcast window location at which each SI in the second set of SI starts to be monitored.

In the above embodiment, at least one of the first set of SI transmitted in the unicast mode and the second set of SI transmitted in the broadcast mode in the SI for which each UE requests is determined according to the received SI request from at least one UE, so as to unicast the first set of SI and broadcast the second set of SI to the corresponding UE, and the transmitting manner is flexible.

Figure 5:
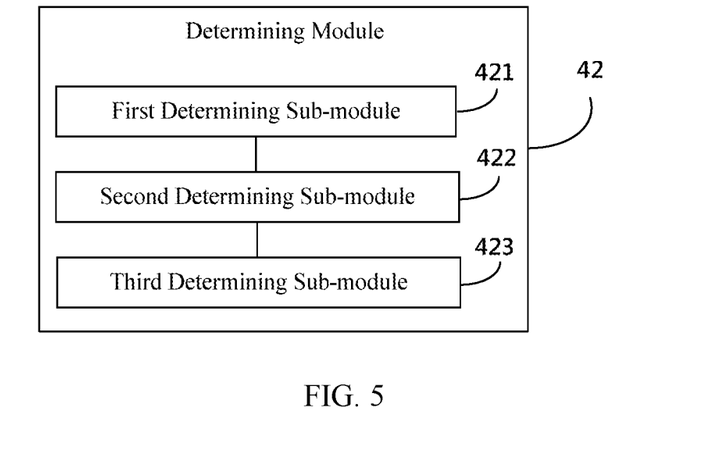
FIG. 5 is a block diagram illustrating another device for transmitting system information according to an exemplary embodiment.

FIG. 5 is a block diagram illustrating another device for transmitting system information according to an exemplary embodiment. As illustrated in FIG. 5, on the basis of the above embodiment illustrated in FIG. 4, the determining module 42 can include a first determining sub-module 421, a second determining sub-module 422 and a third determining sub-module 423.

The first determining sub-module 421 is configured to determine the number of UEs requesting for each SI according to the SI request.

For example, if an UE1 sends an SI request for requesting SI1, SI2 and SI3 to the base station, an UE2 sends an SI request for requesting SI1 and SI3 to the base station, and an UE3 sends an SI request for requesting SI1 and SI4 to the base station, the first determining sub-module 421, according to the above-described SI requests, determines that the number of UEs which request for SI1 is 3, the number of UEs which request for SI2 is 1, the number of UEs which request for SI3 is 1, and the number of UEs which request for SI4 is 1.

The second determining sub-module 422 is configured to, for each SI, if the number of UEs requesting for a current SI determined by the first determining sub-module 421 is less than a preset number, determine that the current SI is transmitted in the unicast mode, and if the number of UEs requesting for the current SI determined by the first determining sub-module 421 is equal to or greater than the preset number, determine that the current SI is transmitted in the broadcast mode.

The preset number can be set as needed. Further description will be given with reference to the above example, assuming that the preset number is 2, for SI1, the number of UEs requesting for the SI1 is greater than the preset number, it is determined that the SI1 is transmitted in the broadcast mode; for SI2, the number of UEs requesting for the SI2 is less than the preset number, it is determined that the SI2 is transmitted in the unicast mode; for SI3, the number of UEs requesting for the SI3 is equal to the preset number, it is determined that the SI3 is transmitted in the broadcast mode; and for SI4, the number of UEs requesting for the SI4 is less than the preset number, it is determined that the SI4 is transmitted in the unicast mode.

The third determining sub-module 423 is configured to determine at least one of a first set of SI transmitted in a unicast mode and a second set of SI transmitted in a broadcast mode in the SI for which each UE requests, according to the SI transmitted in the unicast mode and the SI transmitted in the broadcast mode determined by the second determining sub-module 422.

Since it has been determined that SI1 and SI3 are transmitted in the broadcast mode, and SI2 and SI4 are transmitted in the unicast mode, it is determined that in the SI for which the UE1 requests, the first set of SI transmitted in the unicast mode includes SI2, and the second set of SI transmitted in the broadcast mode includes SI1 and SI3; in the SI for which the UE2 requests, the second set of SI transmitted in the broadcast mode includes SI1 and SI3; and in the SI for which the UE3 requests, the first set of SI transmitted in the unicast mode includes SI4, and the second set of SI transmitted in the broadcast mode includes SI1.

In addition, if an SI identifier transmitted by the current base station in a broadcast mode and not successfully decoded by the corresponding UE is carried in the SI request, the determining module 42 may add SI corresponding to the SI identifier not successfully decoded by the corresponding UE to the first set of SI of the corresponding UE.

It is assumed that an UE4 sends to the base station an SI request for requesting SI6, wherein SI6 is transmitted from the current base station in a broadcast mode and is not successfully decoded by the corresponding UE. Then, at this time, the SI6 may be included in a first set of SI of the UE4.

In the above embodiment, the number of UEs requesting for each SI is determined according to the SI request, and for each SI, if the number of UEs requesting for a current SI is less than a preset number, it is determined that the current SI is transmitted in the unicast mode, and if the number of UEs requesting for the current SI is equal to or greater than the preset number, it is determined that the current SI is transmitted in a broadcast mode; and then at least one of a first set of SI transmitted in a unicast mode and a second set of SI transmitted in a broadcast mode in SI for which each UE requests is determined according to the determined SI transmitted in the unicast mode and the determined SI transmitted in the broadcast mode, and its implementation manner is simple.

Figure 6:
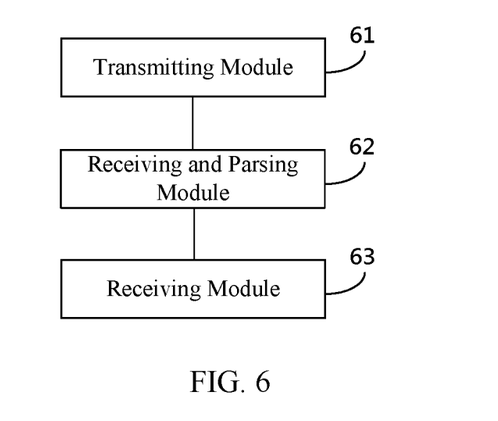
FIG. 6 is a block diagram illustrating a device for receiving system information according to an exemplary embodiment.

FIG. 6 is a block diagram illustrating a device for receiving system information according to an exemplary embodiment. The device can be located in an UE. As illustrated in FIG. 6, the device includes a transmitting module 61, a receiving and parsing module 62 and a receiving module 63.

The transmitting module 61 is configured to transmit a system information (SI) request to a base station.

An SI identifier transmitted by the base station in a broadcast mode and not successfully decoded by a current UE can be carried in the SI request.

The receiving and parsing module 62 is configured to receive a response message of the SI request returned by the base station according to the SI request transmitted by the transmitting module 61, and parse at least one of a first set of SI and indication information for instructing the current UE to receive a second set of SI from the response message. The first set of SI includes SI transmitted by the base station in a unicast mode in SI for which the current UE requests, and the second set of SI includes SI transmitted by the base station in a broadcast mode in the SI for which the current UE requests.

In the embodiment, the indication information can include, but not limited to, at least one of the following information: the SI in the second set of SI being transmitted in a broadcast mode; the number of monitor windows of the SI in the second set of SI uniformly or separately indicated; and a broadcast window location at which each SI in the second set of SI starts to be monitored.

After receiving SI requests transmitted from UEs, the base station can determine the number of UEs requesting for each SI according to the SI requests from the multiple UEs; for each SI, if the number of UEs requesting for a current SI is less than a preset number, it is determined that the current SI is transmitted in a unicast mode, and if the number of UEs requesting for the current SI is equal to or greater than the preset number, it is determined that the current SI is transmitted in a broadcast mode; last of all, at least one of a first set of SI transmitted in a unicast mode and a second set of SI transmitted in a broadcast mode in SI for which each UE requests may be determined according to the determined SI transmitted in the unicast mode and the determined SI transmitted in the broadcast mode.

In addition, if an SI identifier transmitted by the base station in a broadcast mode and not successfully decoded by a current UE is carried in an SI request, the base station may add SI corresponding to the SI identifier not successfully decoded by the current UE to a first set of SI of the current UE.

The receiving module 63 is configured to receive the second set of SI according to the indication information if the receiving and parsing module 62 parses the indication information.

In the above embodiment, the SI request is transmitted to the base station, and the response message to the SI request returned by the base station according to the SI request is received, and at least one of the first set of SI and the indication information for instructing the current UE to receive the second set of SI is parsed from the response message. The first set of SI includes the SI transmitted by the base station in the unicast mode in the SI for which the current UE requests, and the second set of SI includes the SI transmitted by the base station in the broadcast mode in the SI for which the current UE requests. That is, the UE can receive the first set of SI transmitted by the base station in the unicast mode and the second set of SI transmitted by the base station in the broadcast mode, and the success rate of receiving is high.

Figure 7:
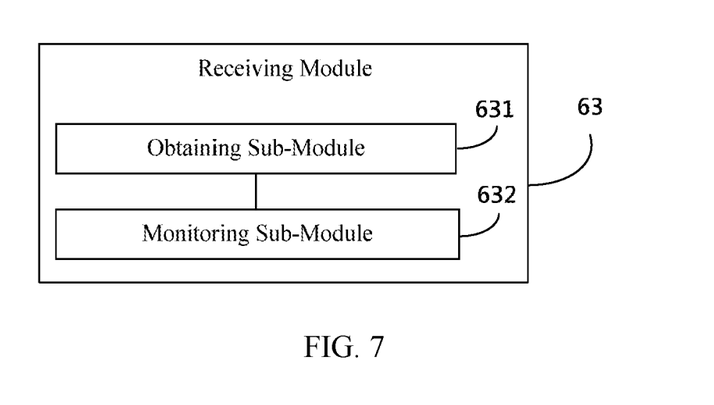
FIG. 7 is a block diagram illustrating another device for receiving system information according to an exemplary embodiment.

FIG. 7 is a block diagram illustrating another device for receiving system information according to an exemplary embodiment. As illustrated in FIG. 7, on the basis of the above embodiment illustrated in FIG. 6, the receiving module 63 can include an obtaining sub-module 631 and a monitoring sub-module 632.

The obtaining sub-module 631 is configured to obtain a broadcast window at which monitoring is initiated, wherein the broadcast window is determined according to a broadcast window location in the indication information, or according to a broadcast period obtained in advance.

The monitoring sub-module 632 is configured to continuously monitor a preset number of broadcast windows beginning from the broadcast window obtained by the obtaining sub-module 631 to receive the SI transmitted by the base station in the broadcast mode, the preset number is equal to the number of monitor windows, or is appointed by the current UE and the base station.

In the above embodiment, a broadcast window at which monitoring is initiated is obtained, and a preset number of broadcast windows beginning from the obtained broadcast window are continuously monitored to receive the SI transmitted by the base station in the broadcast mode, and the success rate of receiving is higher.

Figure 8:
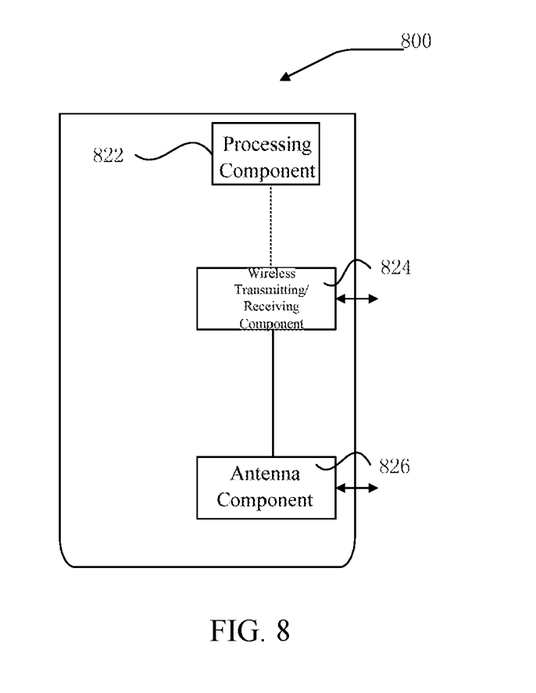
FIG. 8 is a block diagram illustrating a device for transmitting system information according to an exemplary embodiment.

FIG. 8 is a block diagram illustrating a device for transmitting system information according to an exemplary embodiment. The device 800 can be provided as a base station. Referring to FIG. 8, the device 800 includes a processing component 822, a wireless transmitting/receiving component 824, an antenna component 826 and a signal processing section specific to a wireless interface. The processing component 822 can further include one or more processors.

One processor of the processing component 822 can be configured to:

receive a system information (SI) request transmitted from at least one user equipment (UE);

determine at least one of a first set of SI transmitted in a unicast mode and a second set of SI transmitted in a broadcast mode in SI for which each UE requests according to the SI request;

return a response message of the SI request to each UE, wherein the response message carries at least one of the first set of SI of the corresponding UE and indication information for instructing the corresponding UE to receive the second set of SI.

Figure 9:
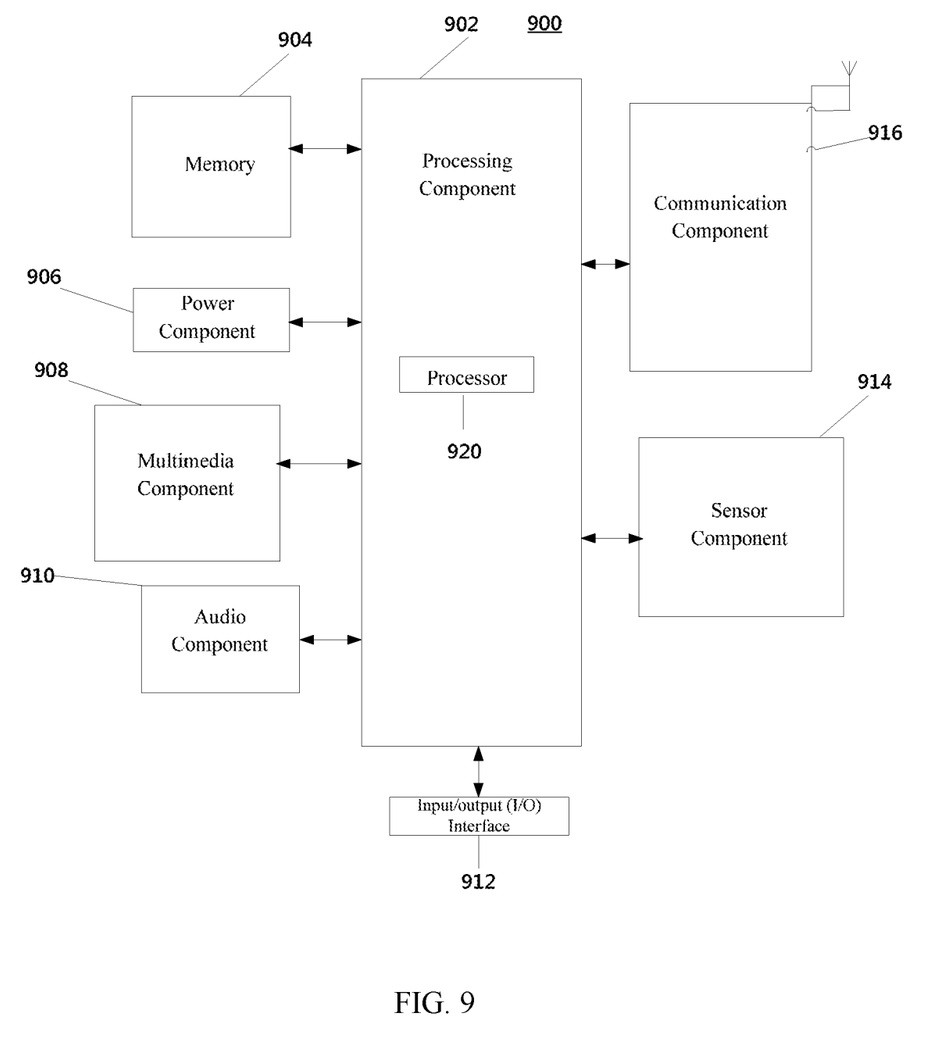
FIG. 9 is a block diagram illustrating another device for receiving system information according to an exemplary embodiment.

FIG. 9 is a block diagram illustrating a device for receiving system information according to an exemplary embodiment. For example, the device 900 may be a mobile phone, a computer, a digital broadcast terminal, a messaging device, a gaming console, a tablet, a medical device, exercise equipment, a personal digital assistant, and the like.

Referring to FIG. 9, the device 900 may include one or more of the following components: a processing component 902, a memory 904, a power component 906, a multimedia component 908, an audio component 910, an input/output (I/O) interface 912, a sensor component 914, and a communication component 916.

The processing component 902 typically controls overall operations of the device 900, such as the operations associated with display, telephone calls, data communications, camera operations, and recording operations. The processing component 902 may include one or more processors 920 to execute instructions to perform all or part of the steps in the above described methods. Moreover, the processing component 902 may include one or more modules which facilitate the interaction between the processing component 902 and other components. For instance, the processing component 902 may include a multimedia module to facilitate the interaction between the multimedia component 908 and the processing component 902.

The memory 904 is configured to store various types of data to support the operation of the device 900. Examples of such data include instructions for any applications or methods operated on the device 900, contact data, phonebook data, messages, pictures, video, etc. The memory 904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the device 900. The power component 906 may include a power management system, one or more power sources, and any other components associated with the generation, management, and distribution of power in the device 900.

The multimedia component 908 includes a screen providing an output interface between the device 900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front camera and/or a rear camera. The front camera and the rear camera may receive an external multimedia datum while the device 900 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 includes a microphone ("MIC") configured to receive an external audio signal when the device 900 is in an operation mode, such as a call mode, a recording mode, and a voice recognition mode. The received audio signal may be further stored in the memory 904 or transmitted via the communication component 916. In some embodiments, the audio component 910 further includes a speaker to output audio signals.

The I/O interface 912 provides an interface between the processing component 902 and peripheral interface modules, such as a keyboard, a click wheel, buttons, and the like. The buttons may include, but are not limited to, a home button, a volume button, a starting button, and a locking button.

The sensor component 914 includes one or more sensors to provide status assessments of various aspects of the device 900. For instance, the sensor component 914 may detect an open/closed status of the device 900, relative positioning of components, e.g., the display and the keypad, of the device 900, a change in position of the device 900 or a component of the device 900, a presence or absence of user contact with the device 900, an orientation or an acceleration/deceleration of the device 900, and a change in temperature of the device 900. The sensor component 914 may include a proximity sensor configured to detect the presence of nearby objects without any physical contact. The sensor component 914 may also include a light sensor, such as a CMOS or CCD image sensor, for use in imaging applications. In some embodiments, the sensor component 914 may also include an accelerometer sensor, a gyroscope sensor, a magnetic sensor, a pressure sensor, or a temperature sensor.

The communication component 916 is configured to facilitate communication, wired or wirelessly, between the device 900 and other devices. The device 900 can access a wireless network based on a communication standard, such as Wi-Fi, 2G, or 3G, or a combination thereof. In one exemplary embodiment, the communication component 916 receives a broadcast signal or broadcast associated information from an external broadcast management system via a broadcast channel. In one exemplary embodiment, the communication component 916 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 904, executable by the processor 920 in the device 900, for performing the above-described methods. For example, the non-transitory computer-readable storage medium may be a ROM, a RAM, a CD-ROM, a magnetic tape, a floppy disc, an optical data storage device, and the like.

Since the device embodiments basically correspond to the method embodiments, reference can be made to the method embodiments for relevant contents. The above-described device embodiments are exemplary only and the units described as separated parts may or may not be physically separated, and the parts displayed as units may or may not be physical units, that is, may be located in one place, or may be distributed on multiple network units. Some or all of the modules may be selected according to actual needs to achieve the objectives of the solutions in the embodiments. Those of ordinary skill in the art can understand and carry them without paying any creative labor.

It should also be noted that, in this text, relational terms such as first and second, etc., are only used to distinguish one entity or operation from another entity or operation, and do not necessarily require or imply any such actual relations or orders present between the entities or operations. The terms "including", "comprising" or any other variations thereof are intended to cover a non-exclusive inclusion such that processes, methods, articles, or devices that contain a series of elements include not only those elements but also include other elements that are not explicitly listed. Alternatively, elements inherent to such processes, methods, articles, or devices can also be included. In case of no more limitations, an element defined by phase "including a . . . " does not exclude the situation where additional identical elements are present in the processes, the methods, the articles, or the devices including the element.

The method and device provided by the embodiments of the present disclosure are described above in detail. Specific examples are used herein to describe the principles and embodiments of the present disclosure. The description of the embodiments above is only intended to help the understanding of the method and its core idea of the present disclosure; meanwhile, those of ordinary skill in the art, according to the idea of the present disclosure, will make changes in the specific embodiments and application ranges. In summary, the contents of this description should not be constructed as limiting the present disclosure.

The invention claimed is:

1. A method for transmitting system information, comprising:
   receiving at least one system information (SI) request transmitted from one user equipment (UE);
   determining a first set of SI transmitted in a unicast mode and a second set of SI transmitted in a broadcast mode in SI for which the one UE requests according to the at least one SI request;
   returning a response message of the at least one SI request to the one UE, the response message carrying the first set of SI of the corresponding UE and indication information for instructing the one UE to receive the second set of SI,
   wherein responsive to that an SI identifier transmitted by a current base station in a broadcast mode and not successfully decoded by a corresponding UE is carried in the SI request, the determining the first set of SI transmitted in the unicast mode and the second set of SI transmitted in the broadcast mode in SI for which the one UE requests according to the SI request comprises:
   adding SI corresponding to the SI identifier not successfully decoded by the corresponding UE to the first set of SI of the corresponding UE,
   wherein the indication information comprises at least one of following information:
   SI in the second set of SI being transmitted in a broadcast mode;
   number of monitor windows of the SI in the second set of SI uniformly or separately indicated; and
   a broadcast window location at which each SI in the second set of SI starts to be monitored.

2. The method according to claim 1, wherein the determining the first set of SI transmitted in the unicast mode and the second set of SI transmitted in the broadcast mode in the SI for which the one UE requests according to the SI request comprises:
   determining number of UEs requesting for each SI according to the SI request;
   for each SI, responsive to that the number of UEs requesting for a current SI is less than a preset number, determining that the current SI is transmitted in a unicast mode, and responsive to that the number of UEs requesting for the current SI is equal to or greater than the preset number, determining that the current SI is transmitted in a broadcast mode; and
   determining at least one of a first set of SI transmitted in a unicast mode and a second set of SI transmitted in a broadcast mode in SI for which each UE requests according to the determined SI transmitted in the unicast mode and the determined SI transmitted in the broadcast mode.

3. A non-transitory computer-readable storage medium having stored therein computer programs that, when executed by a processor, carry out steps of the method for transmitting the system information according to claim 1.

4. A method for receiving system information, comprising:
   transmitting at least one system information (SI) request to a base station;
   receiving a response message of the at least one SI request returned by the base station according to the at least one SI request, and parsing a first set of SI and indication information for instructing a current user equipment (UE) to receive a second set of SI from the response message, wherein the first set of SI comprises SI transmitted by the base station in a unicast mode in SI for which the current UE requests, and the second set of SI comprises SI transmitted by the base station in a broadcast mode in SI for which the current UE requests; and
   receiving the second set of SI according to the indication information responsive to that the indication information is parsed,
   wherein an SI identifier transmitted by the base station in a broadcast mode and not successfully decoded by a current UE is carried in the SI request,
   wherein the indication information comprises at least one of following information:
   SI in the second set of SI being transmitted in a broadcast mode;
   the number of monitor windows of the SI in the second set of SI uniformly or separately indicated; and
   a broadcast window location at which each SI in the second set of SI starts to be monitored.

5. The method according to claim 4, wherein the receiving the second set of SI according to the indication information comprises:
   obtaining a broadcast window at which monitoring is initiated, the broadcast window being determined according to the broadcast window location in the indication information, or according to a broadcast period obtained in advance; and
   continuously monitoring a preset number of broadcast windows from the obtained broadcast window to receive the SI transmitted by the base station in the broadcast mode, the preset number being equal to the number of monitor windows, or being appointed by the current UE and the base station.

6. A non-transitory computer-readable storage medium having stored therein computer programs that, when executed by a processor, carry out steps of the method for receiving the system information according to claim 4.

7. The method according to claim 4, wherein the receiving the second set of SI according to the indication information comprises:

obtaining a broadcast window at which monitoring is initiated, the broadcast window being determined according to the broadcast window location in the indication information, or according to a broadcast period obtained in advance; and continuously monitoring a preset number of broadcast windows from the obtained broadcast window to receive the SI transmitted by the base station in the broadcast mode, the preset number being equal to the number of monitor windows, or being appointed by the current UE and the base station.

8. A device for transmitting system information, comprising:

a processor;

memory for storing instructions executable by the processor;

wherein the processor is configured to:

receive at least one system information (SI) request transmitted from one user equipment (UE);

determine a first set of SI transmitted in a unicast mode and a second set of SI transmitted in a broadcast mode in SI for which the one UE requests according to the at least one SI request received;

return a response message of the at least one SI request to the one UE, the response message carrying the first set of SI of the corresponding UE and indication information for instructing the one UE to receive the second set of SI determined, wherein responsive to that an SI identifier transmitted by a current base station in a broadcast mode and not successfully decoded by a corresponding UE is carried in the SI request, the processor is further configured to:

add SI corresponding to the SI identifier not successfully decoded by the corresponding UE to the first set of SI of the corresponding UE, wherein the indication information comprises at least one of following information:

SI in the second set of SI being transmitted in a broadcast mode;

number of monitor windows of the SI in the second set of SI uniformly or separately indicated; and a broadcast window location at which each SI in the second set of SI starts to be monitored.

9. The device according to claim 8, wherein the processor is further configured to:

determine number of UEs requesting for each SI according to the SI request;

for each SI, responsive to that the number of UEs requesting for a current SI determined is less than a preset number, determine that the current SI is transmitted in a unicast mode, and responsive to that the number of UEs requesting for the current SI determined is equal to or greater than the preset number, determine that the current SI is transmitted in a broadcast mode; and determine at least one of a first set of SI transmitted in a unicast mode and a second set of SI transmitted in a broadcast mode in SI for which each UE requests, according to the SI transmitted in the unicast mode and the SI transmitted in the broadcast mode determined.

10. A device for receiving system information, comprising:

a processor;

memory for storing instructions executable by the processor;

wherein the processor is configured to:

transmit at least one system information (SI) request to a base station;

receive a response message of the at least one SI request returned by the base station according to the at least one SI request transmitted, and parse at least one of a first set of SI and indication information for instructing a current user equipment (UE) to receive a second set of SI from the response message, wherein the first set of SI comprises SI transmitted by the base station in a unicast mode in SI for which the current UE requests, and the second set of SI comprises SI transmitted by the base station in a broadcast mode in SI for which the current UE requests; and receive the second set of SI according to the indication information upon parsing of the indication information, wherein an SI identifier transmitted by the base station in a broadcast mode and not successfully decoded by a current UE is carried in the SI request, wherein the indication information comprises at least one of following information:

SI in the second set of SI being transmitted in a broadcast mode;

the number of monitor windows of the SI in the second set of SI uniformly or separately indicated; and a broadcast window location at which each SI in the second set of SI starts to be monitored.

11. The device according to claim 10, wherein the processor is further configured to:

obtain a broadcast window at which monitoring is initiated, the broadcast window being determined according to the broadcast window location in the indication information, or according to a broadcast period obtained in advance; and continuously monitor a preset number of broadcast windows from the broadcast window obtained to receive the SI transmitted by the base station in the broadcast mode, the preset number being equal to the number of monitor windows, or being appointed by the current UE and the base station.

12. The device according to claim 10, wherein the processor is further configured to:

obtain a broadcast window at which monitoring is initiated, the broadcast window being determined according to the broadcast window location in the indication information, or according to a broadcast period obtained in advance; and continuously monitor a preset number of broadcast windows from the broadcast window obtained to receive the SI transmitted by the base station in the broadcast mode, the preset number being equal to the number of monitor windows, or being appointed by the current UE and the base station.

* * * * *